United States Patent Office 3,707,470
Patented Dec. 26, 1972

3,707,470
PROCESS FOR REMOVING PHENOLIC HYDROXYL GROUP FROM PHENOLIC COMPOUNDS
Yoshiro Sawa, Ashiya, Ryozo Maeda, Osaka, and Junji Irisawa, Nishinomiya, Japan, assignors to Shionogi & Co., Ltd., Osaka, Japan
No Drawing. Filed June 22, 1970, Ser. No. 48,509
Int. Cl. C07d 43/32
U.S. Cl. 260—285
14 Claims

ABSTRACT OF THE DISCLOSURE

Phenolic hydroxyl group of phenolic compounds is removed by reacting a phenolic compound including phenol, cresol, naphthol, guaiacol, thymol, morphinan series phenol, steroidal phenol and salts thereof with a compound represented by the formula:

R—X wherein R is 2-pyridyl, 2-pyrimidyl, 2-quinolyl, 1-isoquinolyl, or 3-isoquinolyl and X is halogen to give an ethereal compound represented by the partial formula:

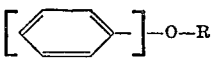

wherein R is as above and hydrogenating the ethereal compound over palladium catalyst in an inert solvent in the range of temperature from 15 to 100° C. to substitute the ether group (R—O—) with hydrogen. The process proceeds economically in a short period with high yields.

The present invention relates to a process for removing a phenolic hydroxyl group from phenolic compounds including phenol, cresol, naphthol, guaiacol, thymol, morphinan series phenol, steroidal phenol and salts thereof. More particularly, this invention relates to an improvement in the process for removing a phenolic hydroxyl group from the phenolic compounds.

The reaction for removing a phenolic hydroxyl group from the phenolic compound is applicable in a broad scope of chemical industries including pharmaceuticals, agricultural chemicals, dyestuffs and animal's drugs. Various methods have heretofore been reported therefor. Some of these known methods are briefly shown as follows:

(a) For obtaining such a compound as having less addiction by removing the 4-hydroxyl group in the preparation of analgesic morphinan compounds from natural thebaine, 3-methoxy-4-hydroxymorphinans are converted into the 4-phenoxy compounds, which are treated with metallic sodium/liquid ammonia to bring about the ethereal fission [Sawa et al.: Jap. Pat. 305,974, 305,975];

(b) p-Methoxyphenol is reacted with diethyl pyrophosphate in carbon tetrachloride in the presence of triethylamine to give p-methoxyphenol diethylphosphate, which is treated with metallic sodium or lithium/liquid ammonia to bring about the ethereal fission [Kenner et al.: J. Chem. Soc. 522, 1955]; this procedure is also adopted for converting estrone into 3-deoxyestrone having serum cholesterol lowering activity [Sakakibara et al.: Jap. Pat. 311,147];

(c) Phenols firstly are converted into their 2,4-dinitrophenyl ether, of which nitro group is hydrogenated to give amino group, and the resulting aminoether is treated with metallic sodium/liquid ammonia to bring about the ethereal fission [Pirkle et al.: J. Org. Chem., vol. 29, 3124 (1964)];

(d) m-Acetylaminophenol p-toluenesulfonate is firstly prepared and then hydrogenated using Raney's nickel as catalyst to give acetanilide together with removal of the tosyloxy group [Kenner et al.: J. Chem. Soc., S 178 (1949)];

(e) β-Naphthol is reacted with dimethylthiocarbamoyl chloride in dimethyl sulfoxide to give O-2-naphthyldimethylthiocarbamate which is heated in methylene chloride to give S-2-naphthyldimethylthiocarbamate, and the latter is heated with sodium hydroxide to give 2-mercaptonaphthalene which is heated with Raney nickel catalyst in ethanol to give naphthalene [Newman et al.: J. Org. Chem., vol. 31, 3980 (1966)];

(f) A phenolic compound is converted into its 1-phenyl-5-tetrazolyl ether, which is then hydrogenated using palladium carbon or platinum dioxide to bring about the ethereal fission [John W. Gates et al. U.S. Pat. 3,489,763].

Of these known methods, however, the methods (a) to (c) take a common procedure of using metallic sodium or lithium/liquid ammonia, and the scope of application of these reactions is limited considerably according to the sort of starting phenols, and so these reactions cannot be applied necessarily in general. When the procedures are applied for a compound other than phenol compounds having methoxy group or phenyl group at the ortho position in fact, no reaction can proceed. Even if the reaction proceeded, the yield decreases remarkably very often. In fact, the said defect is observed, when the known procedures are applied for 3-hydroxymorphinan compounds. Similar experiments on the methods (d) to (f) are effected and the following facts are confirmed. When the method (d) is applied for L-1-acetyl-3-tosyloxymorphinan ethylene ketal, no detosylation proceeds with Raney nickel. When the method (e) is applied, there are observed several defects including the requirement of rather more number of steps (i.e. 4 steps), the falling of the yield in the final step of desulfuration with Raney nickel and the generation of abnormal decomposition during thermal rearrangement into O-2-naphthyldimethylthiocarbamate whereby it is difficult to obtain the product in a high yield. The method (f) is rather generic in point of the etheral fission of a tetrazolylether compound by hydrogenation, whereas the latter step of hydrogenation requires a comparatively larger time for reaction disadvantageously. In this case, the side-product 1-phenyl-5-tetrazolone must be removed with an aqueous alkali hydroxide solution in the step of isolating the reduced product, and there is a defect that a product which is liable to be instable with alkali hydroxide is decomposed.

As results of various investigations for developing a process for removing the phenolic hydroxyl group which overcomes the various defects of known methods, the present inventors have found a process which satisfies such conditions. After examining the related conditions for reaction, the present inventors have established the present invention.

It is a basic object of the present invention to provide an improved process for removing phenolic hydroxyl group from phenol compounds. Another object of this invention is to provide an improved process for dehydroxylation of phenol compounds including phenol, cresol, naphthol, guaiacol, thymol, morphinan series phenol, steroidal phenol and salts thereof. These and other objects, and attendant advantages of the present invention, will be apparent to those who are conversant with the art to which the invention pertains, from the following disclosure and the appended claims.

The present invention involves a process for removing phenolic hydroxyl group from phenolic compounds which comprises reacting a phenolic compound including phenol, cresol, thymol, morpinan series phenol, steroidal phenol and salts thereof with a compound represented by the formula:

R—X     (I)

wherein R is 2-pyridyl, 2-pyrimidyl, 2-quinolyl, 1-isoquinolyl, or 3-isoquinolyl and X is halogen to give an ethereal compound represented by the partial formula:

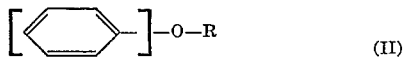 (II)

wherein R is as above and hydrogenating the ethereal compound over palladium catalyst in an inert solvent in the range of temperature from 15 to 100° C. to substitute the ether group (R—O—) with hydrogen.

According to the process of this invention, a phenolic compound including phenol, cresol, thymol, morphinan phenol, steroidal phenol and salts thereof is firstly reacted with the halide (I). The starting phenolic compound involves a variety of phenolic compounds having phenolic hydroxyl group and salts thereof (e.g. alkali metal salt, alkali earth metal salt), including phenol and phenol substituted by one or more of lower alkyl, lower alkoxy, loweralkoxycarbonyl and ketalated formyl groups. Examples of the phenolic compound are morphinans having a phenolic hydroxyl group at the 1-, 2-, 3- or 4-position such as 1-hydroxy-N-methyl-morphinan, 2-hydroxy-N-methylmorphinan, 3-hydroxy-N-methyl-cresols (o- m- and p-cresol), naphthols (1-naphthol, 2-naphthol, 5,6,7,8-tetrahydro-2-naphthol and 5,6,7,8-tetrahydro-1-naphthol), dihydromorphinone, dihydromorphinone ethylene ketal, estradiol, estrone, guaiacol, phenol, ethyl p-hydroxybenzoate, ethyl m-hydroxybenzoate, and ethyl o-hydroxybenzoate. Examples of the morphinan compounds are D-3-hydroxy-N-methylmorphinan, dihydromorphinone ethylene ketal, dihydromorphinone, and D-2-hydroxy-N-methylmorphinan. Another starting halide (I) involves illustratively 2-bromopyridine, 2-bromoquinoline, 1-chloroisoquinoline, 1-iodoisoquinoline, 2-fluoropyridine, 2-bromopyrimidine, 3-bromoisoquinoline and 3-iodoisoquinoline. The reaction may be carried out by refluxing a mixture of the said two starting compounds in an inert solvent containing an inorganic base (e.g. sodium carbonate, potassium bicarbonate, calcium hydroxide, ammonium hydroxide, sodium bicarbonate, sodium hydroxide, sodium amide), favorably in the presence of a metallic catalyst such as copper powder or cupric oxide. Examples of the solvent are methanol, ethanol, dimethylformamide, pyridine, picoline, quinoline, isoquinoline, and collidine. The reaction rate may be favorably accelerated by using an apparatus for dehydrating azeotropically in combination with refluxing. The reaction of this invention can proceed smoothly in general, whereby there is produced an ethereal compound (II).

Secondly, the thus-obtained ethereal compound (II) is hydrogenated over palladium catalyst in an inert solvent in the range of temperature from 15 to 100° C. The palladium catalyst involved is illustrated by palladium sponge, palladium carbon, palladium black, palladium oxide, colloidal palladium, palladium-barium sulfate, palladium-strontium carbonate, and palladium-silica gel, although palladium carbon is most favorable. The hydrogenation may be carried out in a conventional manner in the range of temperature from 15 to 100° C. under atmospheric pressure or a higher pressure of hydrogen in an inert solvent such as ethanol, methanol, dioxane, water, benzene, cyclohexane, methylcyclohexane, tetrahydrofuran, ethyl acetate or ethylene glycol. The reaction may proceed very smoothly, whereby the ethereal fission brings about the substitution of the heterocyclic ether group by hydrogen and there is obtained the dehydroxylated compound.

Advantageous points of the present invention are hereafter shown in comparison with known methods.

(1) The process of this invention can be applied for every sort of phenolic compounds in general without restriction on the scope of applicable compounds as shown in known methods (a) to (c).

(2) Method (c) requires 3 steps and method (e) requires 4 steps whereas the process of this invention requires less steps (i.e. 2 steps), and the present process affords a very high yield. For instance, the yield of hydrogenation in the latter step of method (f) in case of using β-naphthol is 65%, whereas that of this invention is 83.5% (Example 10).

(3) The reaction period in the hydrogenation of this invention is very short without requirement of 15 to 18 hours as in method (f) and the ethereal fission of this invention finishes ordinarily in 2 to 3 hours, although it requires 5 to 8 hours in a few cases. Accordingly, the process of this invention is very excellent in point of the reaction rate.

(4) Side products (e.g. 2-piperidone, tetrahydro-2-pyrimidine, dihydroisocarbostyril) in the hydrogenation of this invention can be removed readily by washing the reaction mixture only with water, and thus there can be obtained high purity of the dehydroxylated compound.

Presently-preferred and practical embodiments of the present invention are illustratively shown in the following examples.

EXAMPLE 1

(a) To a solution of D-3-hydroxy-N-methylmorphinan (derived from sinomenine) (1.2 g.) in pyridine (6 ml.), there are added anhydrous potassium carbonate (1.04 g.), cupric oxide (0.16 g.) and 2-bromopyrimidine (0.84 g.), and the resultant mixture is refluxed at 150 to 155° C. for 3 hours. The insoluble substance is filtered off, the filtrate is evaporated under reduced pressure and the residue is chromatographed on alumina column. The fraction (1.50 g.) eluted with benzene is recrystallized from ethyl acetate to give D-3-(2-pyrimidyloxy)-N-methylmorphinan (1.385 g.) as crystals melting at 177 to 178° C. The yield is 82.5%.

(b) A solution of D-3-(2-pyrimidyloxy)-N-methylmorphinan (500 mg.) in ethanol (30 ml.) is hydrogenated with 20% palladium carbon (prepared from palladium chloride (167 mg.) and active carbon (500 mg.) at 60° C. Hydrogen (121 ml.) is taken up in 2.5 hours. The reaction mixture is filtered to remove the catalyst, and the filtrate is evaporated to remove the solvent. The residue (450 mg.) is shaken with n-hexane/water. The n-hexane layer is washed with water, dried over anhydrous potassium carbonate and the solvent is evaporated. There is obtained D-N-methylmorphinan (301 mg.) as an oil. The yield is 83.6%. The picrate of this substance shows M.P. 162 to 163° C.

EXAMPLE 2

(a) Similarly as in Example 1, D-3-hydroxy-N-methylmorphinan benzene adduct (500 mg.) is treated in pyridine using 1-chloroisoquinoline (256 mg.) to give D-3-(1-isoquinolyloxy)-N-methylmorphinan (488 mg.) as light red crystals. The yield is 85.3%. This substance is recrystallized from acetone to give crystals melting at 184 to 185 °C.

Still, the said product is obtained in a 90% yield using 1-bromoisoquinoline in lieu of 1-chloroisoquinoline.

(b) Similarly as in Example 1, D-3-(1-isoquinolyloxy)-N-methylmorphinan (500 mg.) is hydrogenated with 20% palladium carbon (500 mg.) to give D-N-methylmorphinan (276 mg.) as an oil. The yield is 88.2%.

From aqueous washings, there is obtained dihydroisocarbostyril as a distillate boiling at 140–180° C. (bath temperature)/2 mm. Hg. The yield is 77.5%. This substance affords a picrate showing M.P. 110 to 111° C.

EXAMPLE 3

(a) A solution of D-3-hydroxy-N-methylmorphinan benzene adduct (3.355 g.) in pyridine is treated azeotropically to remove benzene and combined with another portion of pyridine to a total amount of 60 ml. To this solution, there are added 2-bromopyridine (1.66 g.), anhydrous potassium carbonate (2.07 g.) and copper powder (257 mg.), and the resultant mixture is stirred at 150° C. (bath temperature) for 16 hours with azeotropical dehydration. Similarly as in Example 1, the reaction mixture is treated to give D-3-(2-pyridyloxy)-N-methylmorphinan (3.152 g.). The yield is 94.6%. The product is recrystallized from petroleum ether to give crystals melting at 105 to 106° C.

(b) D-3-(2-pyridyloxy)-N - methylmorphinan (500 mg.) is hydrogenated at 60° C. for 3 hours with 20% palladium carbon. Similarly as in Example 1(b), the reaction mixture is treated to give D-N-methylmorphinan (298 mg.) as an oil. The yield is 82.5%.

EXAMPLE 4

(a) To a solution of dihydromorphinone ethylene ketal (960 mg.) in pyridine (20 ml.), there are added 2-bromopyrimidine (700 mg.), anhydrous potassium carbonate (604 mg.) and cupric oxide (150 mg.), and the resultant mixture is refluxed at 150 to 160° C. (bath temperature) for 1 hour with azeotropical dehydration. The reaction mixture is filtered and the insoluble substance is washed with chloroform. The washings are combined with the filtrate, and the mixture is evaporated under reduced pressure to remove the solvent. The residue (1.532 g.) is chromatographed on alumina column, which is eluted with benzene and a mixture of chloroform/benzene to give dihydromorphinone ethylene ketal 2-pyrimidylether (1.320 g.). The yield is quantitative. This substance is recrystallized from benzene to give crystals melting at 215 to 216° C.

(b) A solution of dihydromorphinone ethylene ketal 2-pyrimidylether benzene adduct (850 mg.) in ethanol is treated azeotropically to remove benzene, and the residue is dissolved in ethanol (40 ml.). To the solution, there is added 20% palladium carbon (670 mg.), and the resultant mixture is hydrogenated at 60° C. under atmospheric pressure of hydrogen whereby hydrogen (134 ml.) is taken up in 2.5 hours. The reaction mixture is treated in a conventional manner to give 3-deoxydihydromorphinone ethylene ketal (531 mg.) as crystals melting at 97 to 101° C. The yield is 89.2%. The substance is recrystallized from pertoleum ether to give crystals melting at 102 to 103 C. The substance is hydrolyzed with hydrochloric acid to give 3-deoxydihydromorphinone as crystals melting at 246 to 247° C.

EXAMPLE 5

(a) Dihydromorphinone (1.14 g.) is reacted with 2-bromopyridine (0.665 g.) in pyridine (30 ml.) in the presence of anhydrous potassium carbonate (0.83 g.) and cupric oxide (0.12 g.) to give dihydromorphinone 2-pyridylether (1.03 g.). The yield is 72%.

(b) To a solution of dihydromorphinone 2-pyridylether (1.0 g.) in benzene (25 ml.), there are added p-toluenesulfonic acid monohydrate (0.76 g.) and ethylene glycol (5 ml.), and the resultant mixture is refluxed for 3 hours while azeotropically dehydrating. The reaction mixture is made alkaline with conc. ammonia aqueous solution. The benzene layer is washed with water, dried over anhydrous potassium carbonate and the benzene is removed. The residue is recrsytallized from ether/n-hexane to give dihydromorphinone ethylene ketal 2-pyridylether (950 mg.) as crystals melting at 129 to 131° C. The yield is 85%. Dihydromorphinone ethylene ketal 2-pyridylether is treated as in Example 4(b) to give 3-deoxydihydromorphinone ethylene ketal. The yield is 82%.

EXAMPLE 6

(a) To a solution of estradiol (820 mg.) in pyridine (4 ml.), there are added 2-bromopyridine (500 mg.), anhydrous potassium carbonate (620 mg.) and cupric oxide (103 mg.). The resultant mixture is stirred at 150 to 160° C. for 8 hours while azeotropically dehydrating. The reaction mixture is filtered and the filtrate is evaporated to remove the solvent. The residue is crystallized from methanol to give estradiol 3-(2-pyridyl)ether (958 mg.). The yield is 91.5%. The product is chromatographed on alumina column, and the benzene eluate is recrystallized from methanol to give crystals melting at 103 to 104° C.

(b) A solution of estradiol 3-(2-pyridyl)ether (500 mg.) in ethanol (30 ml.) is hydrogenated with 10% palladium carbon (prepared from palladium chloride (83 mg.) and active carbon (450 mg.)) at 60° C. under atmospheric pressure of hydrogen. Hydrogen (95 ml.) is taken up in 2 hours, and the catalyst is filtered off. The filtrate is evaporated under reduced pressure, and the residue is dissolved in benzene. The benzene layer is washed with water, dried over anhydrous potassium carbonate and the solvent is evaporated. The residue is recrystallized from n-hexane to give 3-deoxyestradiol as colorless needles melting at 118 to 119° C. The yield is 92.5%.

EXAMPLE 7

(a) To a solution of estradiol (545 mg.) in pyridine (5 ml.), there are added 2-bromopyrimidine (334 mg.), anhydrous potassium carbonate (415 mg.) and cupric oxide (69 mg.). The resultant mixture is refluxed at 150 to 160° C. (bath temperature) for 3 hours while azeotropically dehydrating. The reaction mixture is filtered and the insoluble substance is washed with benzene. The washings and the filtrate are combined, and the solvent is evaporated under reduced pressure. The residue (705 mg.) is chromatographed on alumina (3.9 g.) to give estradiol 3-(2-pyrimidylether (565 mg.) from the benzene eluate. The substance is recrystallized from methanol to give crystals melting at 163 to 164° C. The yield is 80.6%.

(b) A solution of estradiol 3-(2-pyrimidyl)ether (340 mg.) in ethanol (30 ml.) is hydrogenated with 20% palladium carbon, and the reaction mixture is treated as in Example 6(b) to give 3-deoxyestradiol (230 mg.). The yield is 93.2%.

EXAMPLE 8

(a) Estrone (370 mg.) is reacted with 2-bromopyridine (227 mg.) in pyridine (4 ml.) in the presence of anhydrous potassium carbonate (284 mg.) and cupric oxide. The reaction mixture is treated as in Example 6(a) to give estrone 2-pyridylether (436 mg.) as crystals melting at 136 to 138° C. The yield is 91.8%.

(b) A solution of estrone 2-pyridylether (347 mg.) in ethanol (40 ml.) is hydrogenated with 20% palladium carbon. Hydrogen (78 ml.) is taken up in 2 hours, and the reaction mixture is treated in a conventional manner to give 3-deoxyestrone (216 mg.) as crystals melting at 143 to 144° C. The yield is 85%.

EXAMPLE 9

(a) To a solution of estrone (2.36 g.) in pyridine (20 ml.), there are added 2-bromopyrimidine (1.46 g.), anhydrous potassium carbonate (1.81 g.) and cupric oxide (300 mg.). The resultant mixture is stirred at 150 to 160° C. (bath temperature) for 4 hours. The reaction mixture is treated as in Example 6(a) to give estrone 2-pyrimidylether (2.558 g.) as crystals melting at 176 to 177° C. The yield is 84%.

(b) A hot solution of estrone 2-pyrimidylether (2.405 g.) in ethanol (150 ml.) is hydrogenated with 20% palladium carbon. The reaction mixture is treated in a conventional manner to give 3-deoxyestrone (1.632 g.). The yield is 93.3%.

EXAMPLE 10

(a) To a solution of β-naphthol (1.295 g.) in pyridine (7 ml.), there are added anhydrous potassium carbonate (1.863 g.), cupric oxide (0.16 g.) and 2-bromopyrimidine (1.5 g.). The resultant mixture is refluxed at 150 to 160° C. (bath temperature) for 5 hours while azeotropically dehydrating. The reaction mixture is filtered to remove the precipitate, and the filtrate is evaporated under reduced pressure to remove the solvent. The residue is chromatographed on alumina whereby the benzene eluate affords 2-(2-pyrimidyloxy)naphthalene (1.884 g.). The yield is 94.2%. The substance is recrystallized from ether to give crystals melting at 92 to 93° C.

(b) To a solution of 2-(2-pyrimidyloxy)naphthalene (1.00 g.) in ethanol (40 ml.), there is added 20% palladium carbon (200 ml.), and the resultant mixture is hydrogenated at room temperature (25° C.) under atmospheric pressure of hydrogen. Hydrogen (310 ml.) is taken up in 7.5 hours, and the catalyst is filtered off. The filtrate is evaporated under reduced pressure, and the residue is dissolved in methylene chloride. The solution is washed with water, dried over anhydrous magnesium sulfate to give naphthalene (482 mg.) (yield: 83.5%) and recrystallized from petroleum ether to give crystals melting at 80° C.

EXAMPLE 11

(a) To a solution of guaiacol (5 g.) in pyridine (30 ml.), there are added anhydrous potassium carbonate (8.35 g.), cupric oxide (0.78 g.) and 2-bromopyridine (6.68 g.), and the resultant mixture is refluxed for 2.5 hours at 150 to 160° C. (bath temperature) while azeotropically dehydrating. The reaction mixture is filtered to remove the precipitate, and the filtrate is evaporated under reduced pressure to remove the solvent. The residue is chromatographed on alumina whereby the benzene eluate affords 2-(2-pyridyloxy)anisole (8.0 g.). The substance is recrystallized from ether/n-hexane to give crystals melting at 92 to 93° C. The yield is 96.4%.

(b) To a solution of 2-(2-pyridyloxy)anisole (53 mg.) in ethanol (4 ml.), there is added 20% palladium carbon (50 mg.), and the resultant mixture is hydrogenated at 60° C. under atmospheric pressure of hydrogen. Hydrogen (17.6 ml.) is taken up in 5.5 hours, and the catalyst is filtered off. The filtrate is chromatographed on a column of 5% polyethylene glycol 6000 (size of column: 35 cm. x 3 mm.) to give anisole in 91.5% of the yield.

EXAMPLE 12

(a) To a solution of 3-hydroxy-1,3,5(10)-estratriene-16-one (1.106 g.) in pyridine (10 ml.), there are added 2-bromopyrimidine (686 mg.), anhydrous potassium carbonate (848 mg.) and cupric oxide (138 mg.), and the resultant mixture is stirred at 150° C. (bath temperature) for 5 hours. The reaction mixture is diluted with benzene (100 ml.), filtrated and the filtrate is evaporated. The residue is dissolved in chloroform and treated with active carbon, and the chloroform is evaporated. The crystalline residue (1.39 g.) is dissolved in petroleum ether (100 ml.) and passed through a column of alumina [Woelm: 6% of water contained] (30 g.). The eluted fraction is recrystallized from methanol to give 3-(2-pyrimidyloxy)-1,3,5(10)-estrantriene-16-one (1.13 g.) as colorless needles melting at 185 to 187° C. The yield is 79.4%.

(b) A solution of 3-(2-pyrimidyloxy)-1,3,5(10)-estratriene-16-one (773 mg.) in ethanol (80 ml.) is shaken in hydrogen stream at 60° C. in the presence of 20% palladium carbon (900 mg.). The reaction mixture is treated in a conventional manner, and the product is recrystallized from methanol/acetone to give 1,3,5(10)-estratriene-16-one (554 mg.) as colorless needles melting at 156° C. The yield is 98.2%.

EXAMPLE 13

(a) To a solution of 3-hydroxy-1-methyl-1,3,5(10)-estratriene-16-one (304 mg.) in pyridine (5 ml.), there are added 2-bromopyrimidine (197 mg.), anhydrous potassium carbonate (228 mg.) and cupric oxide (41 mg.), and the resultant mixture is stirred at 150° C. (bath temperature) for 5 hours. The reaction mixture is treated as in Example 12(a), and the product is recrystallized from methanol/ether to give 3-(2-pyrimidyloxy)-1-methyl-1,3,5(10)-estratriene-16-one (338 mg.) as colorless needles melting at 169° C. The yield is 87.2%.

(b) 3-(2-pyrimidyloxy) - 1 - methyl - 1,3,5(10) - estratriene-16-one (314 mg.) is treated as in Example 12(b) and the product is recrystallized from methanol/acetone to give 1-methyl-1,3,5(10)-estratriene-16-one (234 mg.) as colorless prisms melting at 176° C. The yield is quantitative.

EXAMPLE 14

(a) 1-hydroxy-4-methyl-1,3,5(10)-estratriene-16-one is reacted with 2-bromopyrimidine as in Example 12(a) to give 1-(2-pyrimidyloxy)-4-methyl-1,3,5(10-estratriene-16-one as colorless needles melting at 188° C. (recrystallized from ether/methanol). The yield is 77.8%.

(b) 1 - (2-pyrimidyloxy)-4-methyl-1,3,5(10)-estratriene-16-one is treated as in Example 12(b) to give 4-methyl-1,3,5(10)-estratriene-16-one as colorless needles melting at 193° C. The yield is 83.1%.

EXAMPLES 15 TO 27

TABLE

| Example No. | Parent phenol | R | Ether compound Yield, percent | Ether compound M.P. (or B.P.) | Dehydroxylated product Time, (hrs.) | Dehydroxylated product Yield, percent | Dehydroxylated product Product name |
|---|---|---|---|---|---|---|---|
| 15 | Vaniline ethylene ketal | 2-pyrimidyl | 95 | M.P. 125-6° C | 3 | 95 | m-Methoxybenzaldehyde ethylene ketal. |
| 16 | Ethyl salicylate | do | 94.5 | M.P. 91-2° C | 2 | 91 | Ethyl benzoate. |
| 17 | Ethyl m-hydroxybenzoate | 2-pyridyl | 91 | B.P.$_{0.35}$ 135° C | 3 | 95 | Do. |
| 18 | Ethyl p-hydroxybenzoate | 1-isoquinolyl | 84.2 | M.P. 98° C | 4 | 87 | Do. |
| 19 | do | 3-isoquinolyl | 90.5 | M.P. 64° C | 3 | 88.5 | Do. |
| 20 | 5,6,7,8-tetrahydro-1-naphthol | 2-pyrimidyl | (¹) | M.P. 112° C | 5.5 | 91 | Tetralin. |
| 21 | 5,6,7,8-tetrahydro-2-naphthol | 2-pyrimidyl | 92 | B.P.$_6$ 182° C | 2 | 99 | Do. |
| 22 | Phenol | do | 90 | M.P. 41-2° C | 3.5 | 91 | Benzene. |
| 23 | m-Cresol | do | 92.5 | B.P.$_{10}$ 146° C | 1.5 | 83.9 | Toluene. |
| 24 | p-Cresol | do | 90 | B.P.$_{10}$ 146° C | 2 | 82.9 | Do. |
| 25 | D-2-hydroxy-N-methylmorphinan | do | 82 | M.P. 70-70.5° C | 5 | (¹) | D-N-methylmorphinan. |
| 26 | Guaiacol | 2-pyrimidyl | 95 | M.P. 119-121° C | 2 | (¹) | Anisole. |
| 27 | Ethyl salicylate | 2-pyridyl | 80 | B.P.$_3$ 171° C | 1.5 | 92 | Ethyl benzoate. |

¹ Quantitative.

NOTE.—These results are obtained by effecting the same procedure as in Example 1.

What is claimed is:

1. A process for removing a phenolic hydroxyl group from a phenolic compound which comprises reacting the phenolic compound or a salt thereof with a compound of the formula

R—X wherein R is 2-pyridyl and X is chlorine or bromine, in an inert solvent containing an inorganic base in the presence of copper powder or cupric oxide to yield an ethereal compound represented by the partial formula

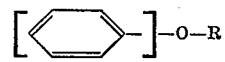

wherein R is defined as above, and hydrogenating the ethereal compound over palladium catalyst in an inert solvent at a temperature from 15 to 100° C.

2. Process according to claim 1, in which the phenolic compound is phenol, cresol, naphthol, guaiacol, thymol, a morphinan series phenol, a steroidal phenol or a salt thereof.

3. Process according to claim 1, in which said phenol is phenolic compound.

4. Process according to claim 14, in which said phenolic compound is guaiacol.

5. Process according to claim 14, in which said phenolic compound is vaniline ethylene ketal.

6. Process according to claim 14, in which said phenolic compound is ethyl salicylate.

7. Process according to claim 14, in which said phenolic compound is ethyl m-hydroxybenzoate or ethyl p-hydroxybenzoate.

8. Process according to claim 1, in which said phenolic compound is o-cresol, m-cresol or p-cresol.

9. Process according to claim 1, in which said phenolic compound is 1-naphthol, 2-naphthol, 5,6,7,8-tetrahydro-2-naphthol, or 5,6,7,8-tetrahydro-1-naphthol.

10. Process according to claim 1, in which said phenolic compound is a morphinan compound having a phenolic hydroxyl group at the 1-, 2-, 3- or 4-position.

11. Process according to claim 10, in which said morphinan compound is a member selected from the group consisting of D-3-hydroxy-N-methylmorphinan,
Dihydromorphinone ethylene ketal,
Dihydromorphinone, and
D-2-hydroxy-N-methylmorphinan.

12. Process according to claim 1, in which said phenolic compound is a steroidal compound having phenolic hydroxyl group at the 1-, 2-, 3- or 4-position.

13. Process according to claim 12, in which said steroidal compound is a member selected from the group consisting of Estradiol,
Estrone,
3-Hydroxy-1,3,5(10)-estratriene-16-one,
3-Hydroxy-1-methyl-1,3,5(10)-estratriene-16-one, and
1-Hydroxy-4-methyl-1,3,5(10)-estratriene-16-one.

14. Process according to claim 1, in which the phenolic compound is phenol or phenol substituted by one or more members selected from the group consisting of lower alkyl, lower alkoxy, loweralkoxycarbonyl and ketalated formyl.

References Cited

UNITED STATES PATENTS

| 3,489,763 | 1/1970 | Gates et al. | 260—668 R |
| 3,496,167 | 2/1970 | Morrow | 260—239.5 |
| 3,085,091 | 4/1963 | Sawa | 260—285 |

FOREIGN PATENTS

| 38/4,071 | 1963 | Japan. |

OTHER REFERENCES

Morrow et al.: Jour. Med. Chem., vol. 9, pp. 249–51 (1966).

DONALD G. DAUS, Primary Examiner

U.S. Cl. X.R.

260—239.5, 251 R, 283 R, 289 R, 290 R, 293.89, 297 R, 297 F, 340.5, 397.3, 397.5, 469 R, 619 R, 621 R, 622 P, 668 R, 668 F

UNITED STATES PATENT OFFICE
CERTIFICATE OF CORRECTION

Patent No. 3,707,470          Dated December 26, 1972

Inventor(s) Yoshiro Sawa, Ryozo Maeda and Junji Irisawa

It is certified that error appears in the above-identified patent and that said Letters Patent are hereby corrected as shown below:

Insert in the Heading of the Patent, after the Serial No.,

--Claims priority, application Japan, June 24, 1969, 49824/1969--

Signed and sealed this 15th day of May 1973.

(SEAL)
Attest:

EDWARD M. FLETCHER, JR.
Attesting Officer

ROBERT GOTTSCHALK
Commissioner of Patents